US00RE38692E

(19) United States
(12) Reissued Patent
Wong

(10) Patent Number: US RE38,692 E
(45) Date of Reissued Patent: Feb. 1, 2005

(54) DRINKING DEVICE

(75) Inventor: Chung Lun Wong, Hong Kong (HK)

(73) Assignee: Fu Hong Industries Ltd., Kowloon (HK)

(21) Appl. No.: 10/390,637

(22) Filed: Mar. 19, 2003

Related U.S. Patent Documents

Reissue of:
(64) Patent No.: 6,325,236
Issued: Dec. 4, 2001
Appl. No.: 09/688,233
Filed: Oct. 16, 2000

(51) Int. Cl.[7] ..... B65D 39/08
(52) U.S. Cl. ..... 220/713; 220/714; 220/717; 215/11.5
(58) Field of Search ..... 220/714, 713, 220/717, 203.19, 718, 203.11, 203.29, 707, 711; 215/11.5, 11.4, 338, 309

(56) References Cited

U.S. PATENT DOCUMENTS 4,146,157 A * 3/1979 Dixon, Sr. et al.
4,184,604 A * 1/1980 Amberg et al.
4,767,019 A * 8/1988 Horner
5,706,973 A * 1/1998 Robbins, III et al. ..... 220/714
5,890,620 A * 4/1999 Belcastro ..... 220/714
6,050,445 A * 4/2000 Manganiello ..... 220/714
6,102,245 A * 8/2000 Haberman ..... 220/714

FOREIGN PATENT DOCUMENTS

| | | |
|---|---|---|
| GB | 2 266 045 | * 10/1993 |
| GB | 2 317 608 | * 4/1998 |
| GB | 2 333 770 | 8/1999 |
| WO | WO 00/28864 | 5/2000 |

* cited by examiner

*Primary Examiner*—Joseph Man-Fu Moy
(74) *Attorney, Agent, or Firm*—Leydig, Voit & Mayer, Ltd.

(57) ABSTRACT

A drinking device including a body having an open end and for containing a liquid, and a lid for sealingly closing the open end of the body. The lid has an outlet incorporating a first one-way valve for dispensing liquid from the body upon the application of suction at the outlet and an inlet incorporating a second one-way valve for air intake to automatically balance the internal pressure within the body with external pressure outside the body while liquid is being dispensed. The first valve includes a chamber having a resiliently deformable wall including a hole in communication with the outlet. The hole is normally closed by being pressed against an internal surface of the body by the resilience of the wall and is openable upon the application of suction.

20 Claims, 4 Drawing Sheets

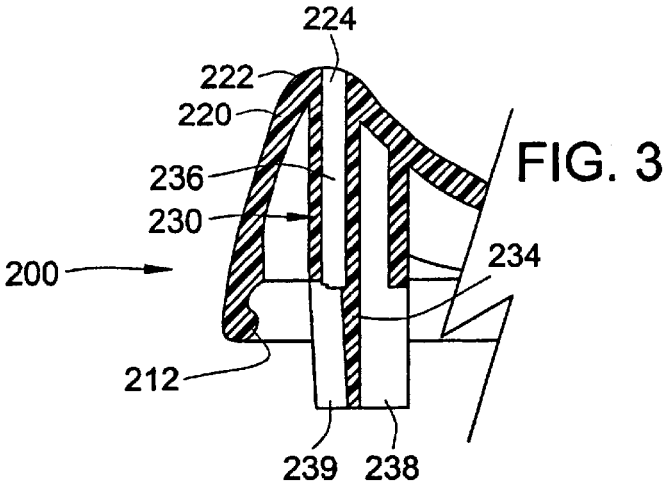
FIG. 3
FIG. 4
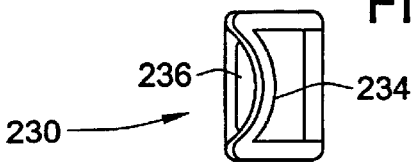
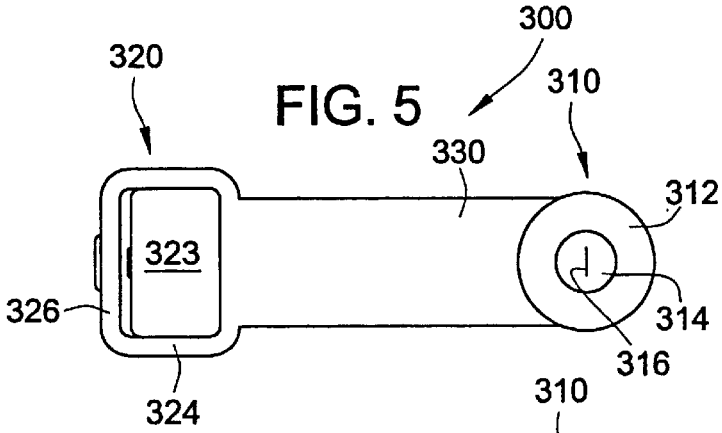
FIG. 5
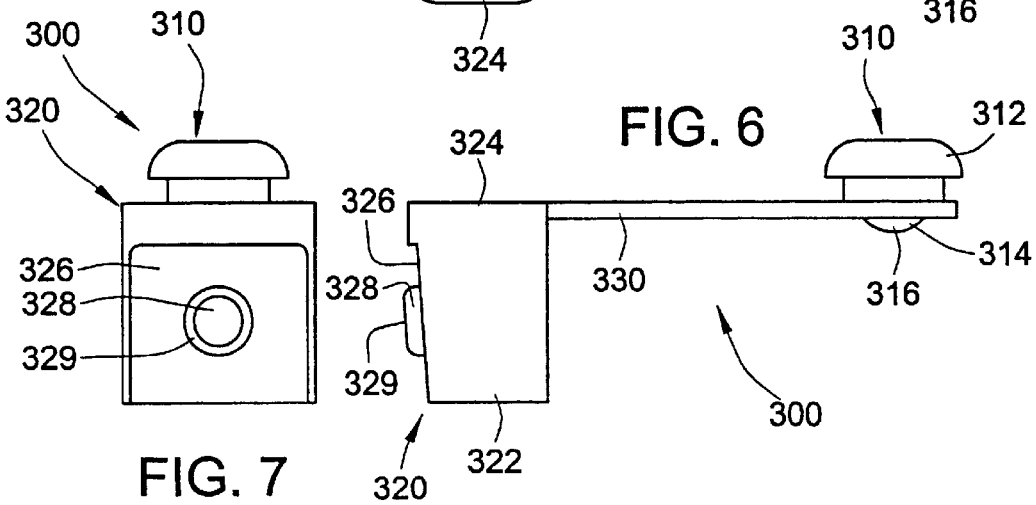
FIG. 6
FIG. 7

DRINKING DEVICE

Matter enclosed in heavy brackets [ ] appears in the original patent but forms no part of this reissue specification; matter printed in italics indicates the additions made by reissue.

The present invention relates to a drinking device, and particularly, but not exclusively, to a trainer cup for infants, which is leak-proof.

BACKGROUND OF THE INVENTION

Leak-proof drinking devices are, of course, generally known, particularly for infants, which usually have a body and a lid closing the body. In one of the known constructions, for example as disclosed in UK Patent No. 2266045, the lid has an outlet for dispensing liquid and an air inlet for pressure balance, both of which are provided with respective one-way valves to protect against leakage.

Liquid is to be extracted from inside the body through suction applied to the outlet. While the valve of the outlet should be closed reasonably tightly normally, it has to be opened relatively easily to facilitate drinking. None of the known devices is found to be satisfactory in this regard.

The invention seeks to mitigate or at least alleviate such a problem by providing an improved drinking device.

SUMMARY OF THE INVENTION

According to the invention, there is provided a drinking device comprising a body having an open upper end and for containing a liquid, a lid for sealingly closing the upper end of the body, the lid having an outlet incorporating a first one-way valve for dispensing the liquid from the body upon the application of suction at the outlet, and an inlet incorporating a second one-way valve for air intake to automatically balance the internal pressure of the closed body with the external pressure while the liquid is being dispensed, wherein the first valve comprises a chamber having a resiliently deformable wall including a hole in communication with the outlet, which hole is normally closed by being pressed against an internal surface of the drinking device by virtue of the resilience of the wall and is openable upon the application of said suction.

It is preferred that the inlet is provided at the lid.

Preferably, the upper end of the body has a rim for engagement with the lid, and the internal surface against which the hole of the chamber wall is normally pressed is provided by an inner surface of the body at a position slightly below the rim.

More preferably, the lid is arranged to engage externally around the rim of the body for closing the body upper end.

In a slightly different construction, the lid includes a depending wall providing the internal surface against which the hole of the chamber wall is normally pressed.

It is preferred that the hole of the chamber wall has a tubular rim protruding outwards for engaging the internal surface of the drinking device.

In a preferred embodiment, the chamber is provided by a resiliently deformable sleeve, and the lid includes a member which extends downwards from the outlet and around which the sleeve is disposed for support to form the chamber, the member incorporating a co-extending internal duct connecting the outlet to the interior of the chamber.

More preferably, the member has an upper end along which the duct extends and a lower end supporting the sleeve and forming a void directly behind the hole of the chamber wall to provide excessive room for that part of the chamber wall to bend inwards for opening the hole.

Further more preferably, the sleeve has a rectangular box-like body having an open upper side which is stretched from below over the lower end of the member to form the chamber.

It is preferred that the lid has a centre hole acting as the inlet, and the second valve is of a slit valve located at the centre hole.

Advantageously, the first and second valves are connected integrally to opposite ends of a flexible member, thereby together forming a one-piece seal.

The aforesaid drinking device may be a trainer cup for infants, wherein the lid includes an upstanding spout having an apex providing the outlet.

BRIEF DESCRIPTION OF DRAWINGS

The invention will now be more particularly described, by way of example only, with reference to the accompanying drawings, in which:

FIG. 3 is a cross-sectional side view of a portion of the lid of FIG. 1;

FIG. 4 is a bottom plan view of a part of the lid portion of FIG. 3;

FIG. 5 is a side view of the seal of FIG. 1;

FIG. 6 is a top plan view of the seal of FIG. 5;

FIG. 7 is an end view of the seal of FIG. 5;

DETAILED DESCRIPTION OF PREFERRED EMBODIMENT

Figure 1:
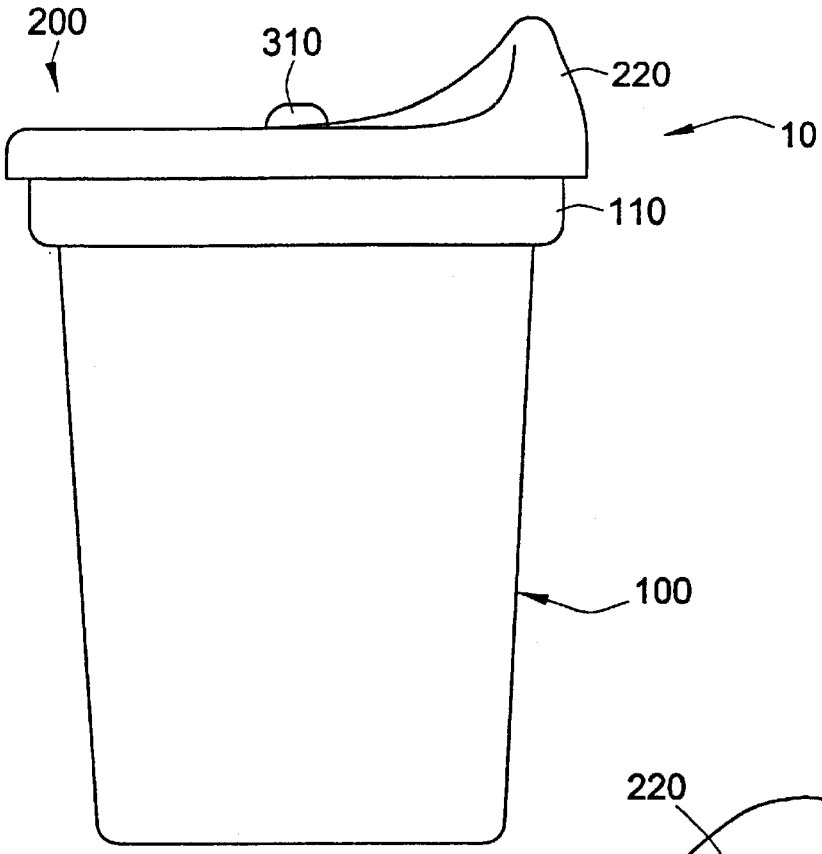
FIG. 1 is a side view of an embodiment of a drinking device in accordance with the invention, the device having a body and a lid incorporating a seal.
Figure 2:
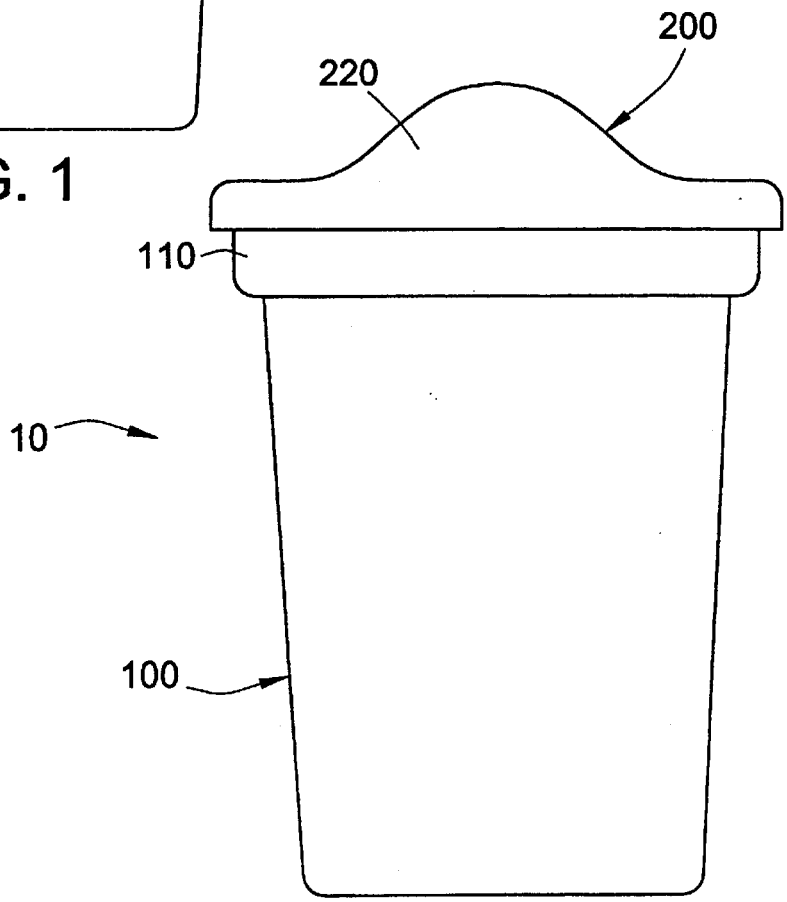
FIG. 2 is a front view of the drinking device of FIG. 1.

Referring initially to FIGS. 1 to 9 of the drawings, there is shown a drinking device embodying the invention, which is in the form of a trainer cup 10 for infants and comprises a plastic body 100 for containing liquid and a plastic lid 200. The cup body 100 includes an open upper end 110 having a circular rim 112, over which the lid 200 is pressed for sealingly closing the cup end 110. The lid 200 has a circular body 210 which comprises a depending rim 212 for externally engaging the cup rim 112, an air inlet hole 214 at the centre, and an upstanding spout 220 on one side.

The spout 220 has an apex 222 with an outlet hole 224 and includes an internal integral member or bar 230 extending, downwards from the apex 222, at a position close to the lid rim 212. The bar 230 has an upper end (half) 232 which has a hollow rectangular cross-section and includes a co-extending partition 234. The partition 234 has a part-circular cross-section and defines a duct 236 extending downwards from the outlet 224 above and on the outer side of the bar 230 facing the lid rim 212. The partition 234 continues onto a lower end (half) 238 of the bar 230, where it is exposed to form an empty space or void 239 on the outer side of the bar 230.

The lid 200 incorporates a resiliently deformable seal 300 made of silicone rubber. The seal 300 includes a one-way slit valve 310 and another one-way valve including a sleeve 320, which are connected integrally to opposite ends of a tape 330, thereby together forming a one-piece structure.

Figure 8:
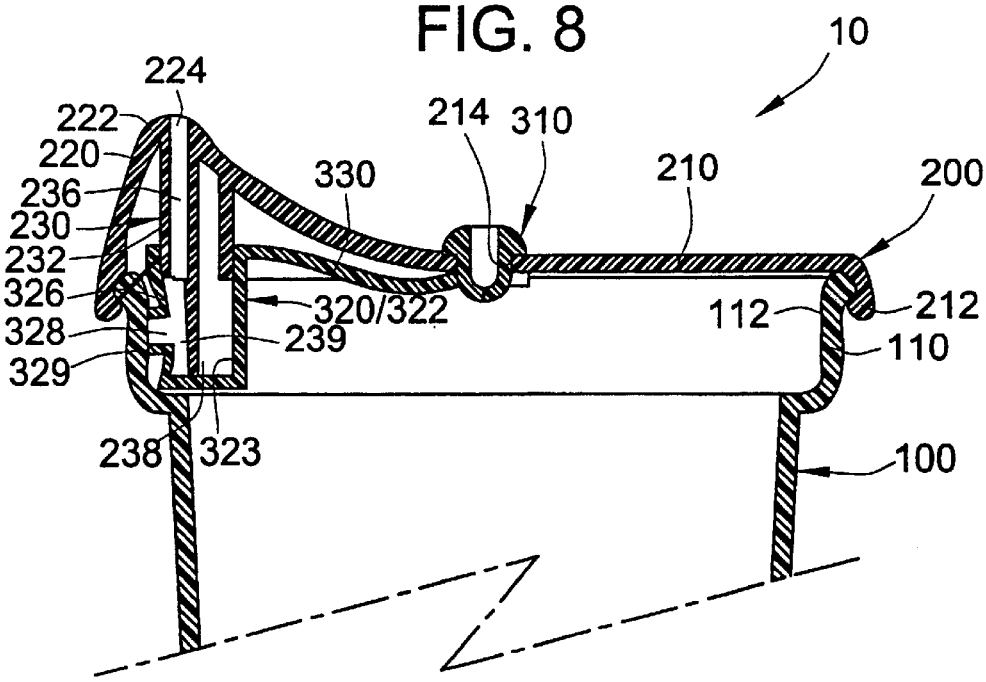
FIG. 8 is a cross-sectional side view of an upper portion of the drinking device of FIG. 1, with the seal in a closed condition.

The slit valve 310 has a grommet-like body 312 press-fitted from below through the inlet 214 of the lid 200 and includes a hemispherical valve member 314 at the lower end of the body 312. The valve member 314 includes a split 316 that is normally-closed (FIG. 8). The valve member 314 protrudes from the underside of the lid 200 such that the slit 316 will open (FIG. 9) when the pressure inside the closed cup 100 drops.

The sleeve 320 has a rectangular box-like sleeve body 322 having an open upper side 324, which is stretched from below over the lower end 238 of the bar 230 of the lid 200. The upper rim of the sleeve body 322 reaches over the lowermost end of the upper end 232 of the bar 230, thereby forming a chamber 323 enclosing the lower bar end 238.

Outer wall 326 of the sleeve body 322 or chamber 323 includes a hole 328 which has a tubular rim 329 protruding outwards. The hole 328 is positioned directly in front of the void 239 in the bar 230 such that there is excessive room, as provided by the void 239, for the part of the chamber wall 326 including the rim 329 to bend inwards.

The spout outlet 224 is in communication with the sleeve hole 328 via the duct 236 and the void 239, whereby a through path X is formed. The bar 230 is arranged such that when the lid 200 is in place, the rim 329 of the sleeve hole 328 is pressed against the inner surface of the cup body 100 at a position slightly below the rim 112, whereby the hole 328 is normally closed and hence the path X blocked (FIG. 8).

Figure 9:
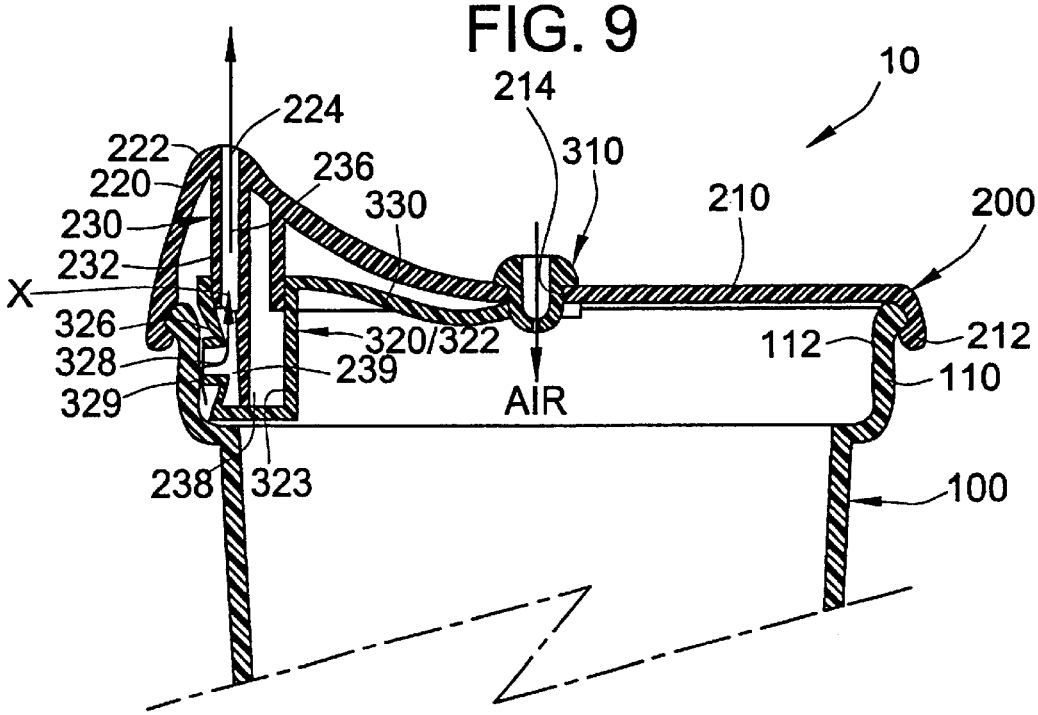
FIG. 9 is a cross-sectional side view corresponding to FIG. 8, showing the seal in an open condition.

When the trainer cup 10 containing water (for example) is in use at an inverted position, the infant sucks at the spout 220 and thus creates a suction or pressure drop within the chamber 323. The pressure drop causes the wall 326 of the sleeve body 322 to bend inwards, thereby moving the rim 329 away from the aforesaid inner surface of the cup body 100 and thus resulting in opening or unblocking of the hole 328 (FIG. 9). Water can simultaneously flow out along the path X and be dispensed at the spout 220 for as long as the infant is sucking, via the sleeve 320 acting as a one-way valve.

The loss of water creates a pressure drop within the cup 10, which is compensated in terms of volume by air drawn in through the slit valve 310, which automatically opens for air intake to balance the internal pressure of the cup 10 with the external pressure, as required, for water dispensing. When the infant stops drinking, the hole 328 is instantly re-closed by virtue of the resilience of the chamber wall 326.

By reason of the construction of the one-way dispensing valve with the sleeve 320, the subject drinking device 10 enables users to drink easily, while preventing liquid leakage when not in use.

Figure 10:
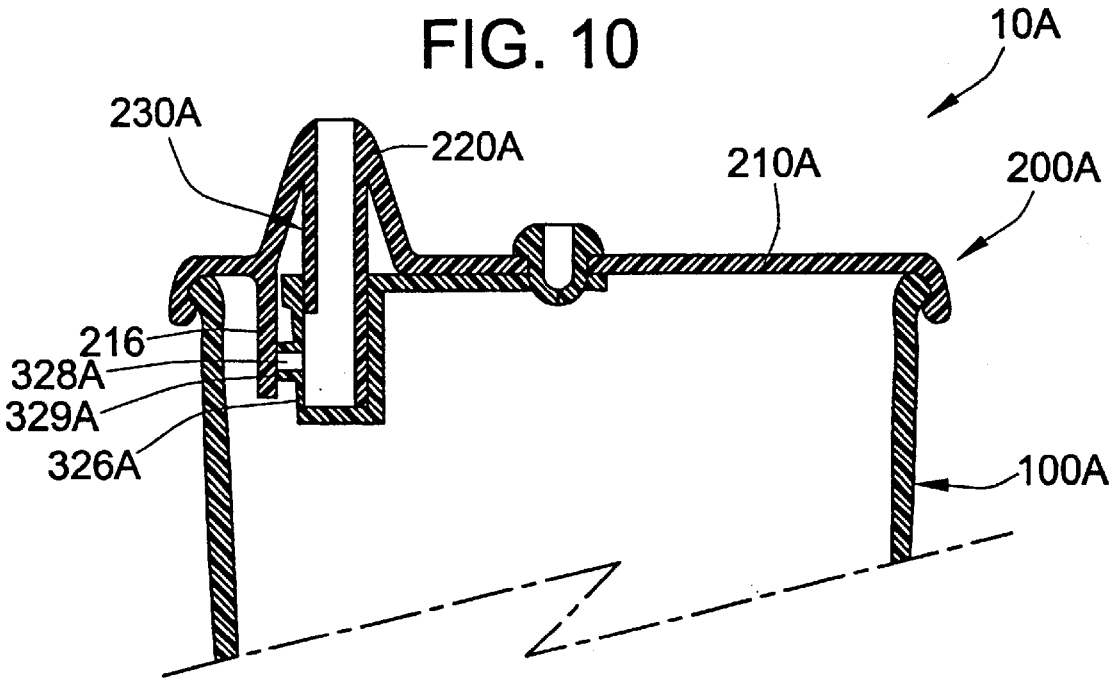
FIG. 10 is a cross-sectional side view of an upper portion of a slightly different embodiment of a drinking device in accordance with the invention.

Reference is now made to FIG. 10, which shows a slightly different cup 10A embodying the invention, with equivalent parts designated by the same reference numerals suffixed by a letter "A". Compared with the previous cup 10, the only major difference of this cup 10A lies in the lid 200A having an integral wall 216 which extends downwards from the lid body 210A at a position close to the bar 230A. The wall 216 provides an inner surface for pressing by the rim 329A and closing the hole 328A of the chamber wall 326A, as an alternative to the inner surface of the previously described cup body 100. With this construction, the spout 220A will remain closed even when the lid 220A is removed from the cup body 100A.

In general, it is envisaged that the air inlet (with slit valve) may be provided on the cup body instead of the lid, for example on the shoulder of the cup body in the case where the cup body has an open end of a reduced size.

The invention has been given by way of example only, and various other modifications of and/or alterations to the described embodiments may be made by persons skilled in the art without departing from the scope of the invention as specified in the appended claims.

What is claimed is:

1. A drinking device comprising:

a body having an open end and for containing a liquid, and a lid for sealingly closing the open end of the body, said lid having an outlet incorporating a first one-way valve for dispensing a liquid from the body through the outlet, upon application of suction to the outlet, and an inlet incorporating a second one-way valve for air intake to automatically balance internal pressure within the body, sealed with the lid, with external pressure outside the body while a liquid is being dispensed through the outlet, wherein the first one-way valve comprises a chamber having a resiliently deformable wall including a hole in communication with the outlet *and a resiliently deformable sleeve, and the lid includes a member extending from the outlet within the sleeve and forming the chamber, the member including an internal duct connecting the outlet to the chamber,* and, when the body is sealed with the lid, the first one-way valve is normally closed by pressing of the resiliently deformable wall against an internal surface of the body by resilience of the resiliently deformable wall and the first one-way valve is opened upon application of suction to the outlet.

2. The drinking device as claimed in claim 1, wherein the inlet is located in the lid.

3. The drinking device as claimed in claim 1, wherein the open end of the body has a rim for engagement with the lid.

4. The drinking device as claimed in claim 3, wherein the lid externally engages the rim of the body for sealing the open end of the body.

5. The drinking device as claimed in claim 1, wherein the chamber wall has a protruding tubular rim surrounding the hole for engaging the surface of the wall depending from the lid of the body for closing the hole.

6. The drinking device as claimed in claim 1, wherein the chamber wall has a protruding tubular rim surrounding the hole for engaging the internal surface of the body for closing the hole.

[7. The drinking device as claimed in claim 1, wherein the chamber includes a resiliently deformable sleeve, and the lid includes a member extending from the outlet within the sleeve and forming the chamber, the member including an internal duct connecting the outlet to the chamber.]

8. The drinking device as claimed in claim [7] *1*, wherein the member has a first end along which the duct extends and a second end supporting the sleeve and including a void directly opposite the hole receiving part of the resiliently deformable wall upon opening of the first one-way valve.

9. The drinking device as claimed in claim [7] *1*, wherein the sleeve has a rectangular box-like body having an open side receiving the member.

10. The drinking device as claimed in claim 1, wherein the inlet includes a hole in the lid, and the second one-way valve is a slit valve located in the hole in the lid.

11. The drinking device as claimed in claim 1, including a flexible member wherein the first and second one-way valves are integral to and located at opposite ends of the flexible member.

12. The drinking device as claimed in claim 1, wherein the outlet includes an upstanding spout in the lid.

13. A drinking device comprising:

a body having an open end and for containing a liquid, and a lid for sealingly closing the open end of the body, said lid having an outlet incorporating a first one-way valve for dispensing a liquid from the body through the outlet in a direction generally transverse to the lid, upon application of suction to the outlet, an inlet incorporating a second one-way valve for air intake to automatically balance internal pressure within the body, sealed with the lid, with external pressure outside the body while a liquid is being dispensed through the outlet, and a depending wall extending into the body when the body is sealed with the lid, wherein the first one-way valve comprises a chamber having a resiliently deformable wall including a hole in communication with the outlet, the first one-way valve being normally closed by pressing of the resiliently deformable wall against the depending wall depending from the lid, by resilience of the resiliently deformable wall, and the first one-way valve being opened by moving in a direction generally transverse to the outlet, upon application of suction to the outlet.

14. The drinking device as claimed in claim 13, wherein the inlet is located in the lid.

15. The drinking device as claimed in claim 13, wherein the open end of the body has a rim for engagement with the lid.

16. The drinking device as claimed in claim 15, wherein the lid externally engages the rim of the body for sealing the open end of the body.

17. The drinking device as claimed in claim 13, wherein the chamber includes a resiliently deformable sleeve, and the lid includes a member extending from the outlet within the sleeve and forming the chamber, the member including an internal duct connecting the outlet to the chamber.

18. The drinking device as claimed in claim 17, wherein the member has a first end along which the duct extends and a second end supporting the sleeve and including a void directly opposite the hole receiving part of the resiliently deformable wall upon opening of the hole.

19. The drinking device as claimed in claim 17, wherein the sleeve has a rectangular box-like body having an open side receiving the member.

20. The drinking device as claimed in claim 13, wherein the inlet includes a hole in the lid, and the second valve is a one-way slit valve located in the hole in the lid.

21. The drinking device as claimed in claim 13, including a flexible member wherein the first and second one-way valves are integral to and located at opposite ends of the flexible member.

* * * * *